3,461,138
ACETALS OF p-MENTHANE-DIOL-3,8 AND p-MENTHENE-1-DIOL-3,8 AND METHOD OF PREPARING SAME
Yves Rene Naves and Paul Albert Ochsner, Geneva, Switzerland, assignors to The Givaudan Corporation, New York, N.Y., a corporation of New Jersey
No Drawing. Filed Oct. 16, 1964, Ser. No. 404,517
Claims priority, application Switzerland, Oct. 21, 1963, 12,891
Int. Cl. C07d 15/00; A61k 7/00
U.S. Cl. 260—340.3     11 Claims

ABSTRACT OF THE DISCLOSURE

A family of new cyclic acetals is disclosed. These compounds have the formula:

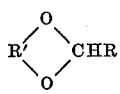

wherein R' is a bivalent terpenic moiety selected from

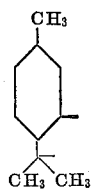

and

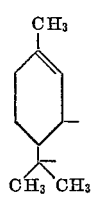

the dash lines denoting that the 3 and 8 position carbon atoms have unsatisfied valences, which positions, in the first formula given above, are each linked to an O, and R is a member selected from the group consisting of H, an alkyl radical having from 1 to 7 carbon atoms, and an alkylene radical having from 1 to 7 carbon atoms.

Among specific compounds disclosed are the acetals of p-menthane-diol-3,8 and acetaldehyde; the formal of p-menthane-diol-3,8; an acetal of p-menthene-1-diol-3,8; an acetal of p-menthane-diol-3,8 and isovaleric aldehyde; and an acetal of p-menthane-diol-3,8 and benzaldehyde.

The new acetals are useful as perfume and flavor materials.

---

The present invention relates to novel cyclic acetals, to a process for preparing the same, and to novel perfume compositions containing the novel acetals.

The novel acetals of this invention may be represented by the following formula:

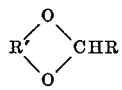

wherein R' is a bivalent terpenic moiety selected from

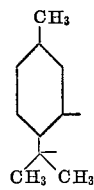

and

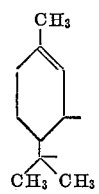

the dash lines denoting that the 3 and 8 position carbon atoms have unsatisfied valences, which positions, in the first formula given above, are each linked to an O, and R is a member selected from the group consisting of H, an alkyl radical having from 1 to 7 carbon atoms, and an alkylene radical having from 1 to 7 carbon atoms.

It will be appreciated by those skilled in the art that the glycolic part of the formula of the novel acetals represents the saturated diol, p-menthane-diol-3,8 or the unsaturated diol, p-menthene-1-diol-3,8. It should also be understood the novel acetals may exist in optically active or racemic forms, all of which are encompassed in this invention.

The novel acetals of this invention possess unique qualities, making them useful in perfumery, especially in rose or lilac perfume compositions, and as flavoring agents where fruity effects are desired. The acetals are very stable and difficult to hydrolyze. In view of their resistance to alkalies, the acetals are particularly appropriate for use in perfumes for soaps.

As will be understood by those skilled in the use of perfume agents and flavoring materials, it is not possible or feasible to give specific instructions for the use of the acetals in such arts, as there are so many factors which govern the amounts of materials employed. Among such factors are cost of materials, the personal preferences of the perfumer or flavor expert, the nature of the particular composition, etc. Nonetheless, it will be readily apparent to those skilled in the art as to how to employ the acetals of this invention in particular situations.

In general, the acetals of this invention may be prepared by reacting a diol, as aforesaid, with one or more aldehydes having up to 8 carbon atoms, in the presence of an acidic reagent. The diols may be, e.g., menthoglycol, neomenthoglycol, or the corresponding para-menthene-1-diol-3,8 reactants. As aldehydes may be used aliphatic, cycloaliphatic or aromatic aldehydes, which may be saturated or unsaturated.

The acidic reagents which may be used in accordance with this invention are those which are suitable as catalysts in conducting acetal reactions. Specific examples of suitable catalysts for use in the present process are calcium chloride, ammonium chloride, sulfuric acid and orthophosphoric acid. Other suitable catalysts include those mentioned in Houben-Weyl: Methoden der Org. Chemie, 4th ed., vol. VII, first part, p. 419.

The reaction of this invention involving the use of a diol starting material is preferably carried out at ambient room temperature, e.g., around 20°–25° C. At temperatures substantially below room temperature, this reaction is too slow. At temperatures substantially above room temperature, it may be necessary to conduct the reaction under pressure, where low molecular weight aldehydes are used.

It has been unexpectedly found that it is not essential that the acetal be formed from the diols, but, instead, the acetals may be formed directly from citronellal or citral and an aldehyde, as aforesaid. The unexpected nature of this finding is apparent when one considers what is already known concerning the reactions of citronellal and citral. An illustration of such known reactions involving citronellal will now be mentioned.

It is known that menthoglycol and neomenthoglycol can be prepared by reacting an inorganic acid such as sulfuric acid, or ortho-phosphoric acid, with beta-citronellal, in the presence of water. There is thus obtained, in varying proportions, according to the concentration of the acid, or according to the temperature, a para-menthatriene-menogerene, some isopulegol and some neoisopulegol, some menthoglycol and some neomenthoglycol, and the acetals of these glycols with alpha- and beta- citronellals and with hydroxy-dihydrocitronellal. There is thus obtained, starting with (+) beta-citronellal, the (−) menthoglycol M.P.=72–73° C. and the (+) neomenthoglycol M.P.=65.5°–66° C.; starting from (±) beta-citronellal, the (±) menthoglycol M.P.=75.5°–76° C. and the (±) neomenthoglycol M.P.=82–83° C. are obtained.

The production of isopulegols and menthoglycols results from an intramolecular Prins reaction. The addition of a proton to citronellal gives a carbonium ion which is cyclized with transfer of the charge on carbon 8. These new ions lose a protron resulting in isopulegols and when reacted with water, give, with liberation of a protron, the menthoglycols.

The acetals of the menthoglycols with citronellal and with hydroxydihydrocitronellal, which form during the treatment of beta-citronellal with inorganic acids, have already been described in the literature (M. Stoll and P. Bolle, Helv. Chim. Acta 31, 1 (1948)).

It was quite surprising, therefore, to find that the secondary reactions which accompany the production of menthoglycols in the absence of the aldehydes used in this procedure, that is to say, the production of menogerene, isopulegol and neoisopulegol and above all those involving the formation of the acetals of menthoglycols with citronellal and hydroxydihydrocitronellal, are substantially reduced in accordance with the present process.

If desired, isopulegol or neoisopulegol, or a mixture thereof, may be used in place of citronellal in accordance with one aspect of the process of this invention. However, we presently prefer the use of citronellal, because we have found that the use of isopulegol is more costly than the direct conversion of citronellal.

Where citronellal is employed in accordance with the process of this invention, it has been found that temperatures within the range from about −10° C. and +5° C. give advantageous results for the direct conversion to acetals.

The direct use of citral, e.g., citral $b$ or mixtures of citrals $a$ and $b$, in place of citronellal, also leads to the formation of acetals. As will be understood by those skilled in the art, the resulting actals will be acetals of p-menthene-1-diol-3,8, also named hydroxy-8-piperitol. If desired, the resulting unsaturated acetals may be hydrogenated to form acetals of p-menthane-diol-3,8. Thus, specifically, acetals of (±) menthoglycol and (±) neomenthoglycol may be formed thereby.

The following examples illustrate the practice of the invention which is not to be limited thereby, e.g., to the aldehydes named, but includes the use of saturated or unsaturated aldehydes having from one to eight carbon atoms. Likewise, the operating conditions may be varied as regards the relative proportions of the reactants, the nature and concentration of the acids, and the temperature and duration of the reaction without notably reducing the yields. All temperatures are in degrees centigrade and "g" designates "grams."

EXAMPLE I

Acetal of (−) menthoglycol and acetaldehyde

To 35 g. of (−) menthoglycol, there was added 14.5 of acetaldehyde and 5 g. of powdered calcium chloride. The mixture was permitted to stand for eight days at room temperature. The contents were then treated with pentane, washed in salt water, dried and distilled. There was obtained 38 g. B.P.$_{15}$=101–102° C.; $\alpha_D^{20}$=15.6°; $d_4^{20}$=0.9595; $n_D^{20}$=1.4604. Vapor chromatography at 160° C. on Reoplex 100 (Geigy) on Celite (20 to 80) in the hydrogen effluent in atmosphere is less than 60 ml./min. with only one peak. Elementary analysis yielded $C_{12}H_{22}O_2$.

Acetal of (+) neomenthoglycol and acetaldehyde

The same procedure, beginning with (+) neomenthoglycol, gave the acetal B.P.$_{15}$=100–101° C.; $\alpha_D^{20}$=17.2° C.; $d_4^{20}$=0.9605; $n_D^{20}$=1.4606. Vapor chromatography conducted as above gave only one peak. Elementary analysis gave the composition, $C_{12}H_{22}O_2$.

The two above acetals are differentiated by the following infrared absorptions: acetal of menthoglycol: 1028, 843, 787 and 676 cm.$^{-1}$, acetal of neomenthoglycol: 1285, 947, 907, 870, 818, 803 and 699 cm.$^{-1}$.

The odor of the acetals is rosy, green and fresh. The acetal of menthoglycol is slightly minty.

EXAMPLE II (a) Into a flask provided with an agitator, a thermometer, a dropping funnel, and a brine refrigerant, 300 g. of a mixture of sulfuric acid and water in equal parts by weight was placed. The contents was chilled at 0° C., and then a cooled mixture of 100 g. of (+) beta-citronellal and 150 g. of acetaldehyde was introduced under agitation over a period of 30 to 40 minutes, without permitting the temperature to go above 5° C. After this addition agitation was continued for 30 minutes, and then the mixture was poured over 500 g. of crushed ice. After extraction with petroleum ether, B.P.=60–80° C., the contents were washed and neutralized.

Upon distillation and fractionation over a spinning band column, 92 grams of acetals were obtained. These were obtained as the acetal of neomenthoglycol, followed by the acetal of menthoglycol, with all of the characteristics of the preparation mentioned in Example I.

Repetition of the process, starting with (±) beta-citronellal gives acetals having no rotatory power, identified as being the same as the above preparations by the time of retention of vapor chromatography and by the infrared spectra.

(b) Part (a) of this example was repeated, except that the sulfuric acid was replaced by 250 g. of ortho-phosphoric acid. There was obtained 83 g. of acetals having substantially the same properties as those obtained in part (a) of this example.

EXAMPLE III

In an apparatus identical with that mentioned in Example II, there was placed 140 g. of trioxymethylene and 400 ml. of sulfuric acid (aqueous), of 50% concentration; and the mixture was brought to 80° C. It became progressively clearer. After a limpid liquid formed, the contents was cooled to 0° C. and then there was added, under agitation, keeping the temperature below 5° C., over a period of 30–40 minutes, 100 grams of (+) beta-citronellal. The contents of the flask became progressively milky. After the addition was finished, agitation was continued for 30 minutes more and then the mixture was poured over 750 g. of crushed ice. After filtration, the filtrate was extracted with benzene and washed until neutral. The product was freed of benzene by distillation and freed of heavy products (89 g.) by rectification and then fractionated by distillation. The product was then separated into the following two isomers:

Formal of neomenthoglycol and the formal of menthoglycol

The former had the following properties: $B.P._{10}=89-90°$ C.; $\alpha_D^{20}=-15.6°$ C.; $d_4^{20}=0.988$; $n_D^{20}=1.4666$. Vapor chromatography, effectuated in accordance with the mode of operation set forth in Example I, gives only one peak. Elementary analysis for the composition: $C_{11}H_{20}O_2$.

The formal of menthoglycol had the following properties: $B.P._{10}=92-93°$ C.; $-\alpha_D^{20}=11.2°$ C.; $d_4^{20}=0.9830$; $n_D^{20}=1.4648$. The product solidifies slowly, melting point 37.0–37.5° C. Its vapor chromotography and elementary analysis are as satisfactory as those of the formal of neomenthoglycol of this example.

These two substances possess rosy, green, fresh odors.

EXAMPLE IV

Example II was repeated except that in place of the citronellal, 100 g. of an equilibrium mixture of 34% of citral b and 66% of citral a was used. There was obtained 34 g. of the acetal of trans-hydroxy-8-piperitol (p-menthene-1-diol-3,8), indicated to be substantially pure by vapor chromatography.

Its constants were as follows: $B.P._{.2}=76-77°$ C.; $d_4^{20}=0.989$; $n_D^{20}=1.4782$.

Elementary analysis gave the following formula: $C_{12}H_{20}O_2$.

Into 10 g. of the acetal of trans-hydroxy-8-piperitol, 2 g. of the Adams catalyst ($PtO_2$) and about 50 ml. of acetic acid, maintained under agitation, at 20° C., and atmospheric pressure, there was absorbed 1,200 ml. of hydrogen. The product, diluted with water, was extracted with ether after addition of sodium carbonate, and then was washed until neutral and concentrated.

It was then analyzed by vapor chromatography under the conditions of Example I. It was found to consist of 25% of acetal of neomenthoglycol and 75% of acetal of menthoglycol. The infrared absorption spectrum is the same as the mixture of the same proportions of the acetals of Example I.

EXAMPLE V

Example II was repeated, using 130 g. of isovaleric aldehyde with 20 g. of ethanol in place of the acetaldehyde.

The crude product was extracted with petroleum ether and rectified by steam distillation. There was obtained 128.7 g. of distillate which on redistillation yielded a distillate, $B.P._{0.9}=72-74°$ C.; $n_D^{20}=1.4595-1.4608$.

Vapor chromatography at 180°, on Reoplex 100 Geigy, on Celite, indicates the presence of two major constituents and one minor constituent with intermediate time of retention. Elementary analysis gave the formula $C_{15}H_{28}O_2$, confirming that the product is the acetal of p-menthane-diol-3,8 and isovaleric aldehyde.

Redistillation over a spinning band column yielded an isomer with a lesser time of retention, and of substantial purity (98%), with a $B.P._{1.05}=80-81°$ C.; $d_4^{20}=0.9299$; $\alpha_D=14.2°$; and a product with greater time of retention, but still containing 15% of the intermediate substance, according to vapor chromatography. Analysis of the product gave the formula: $C_{15}H_{28}O_2$.

The odor of both of the products obtained in accordance with this example was heavy and earthy, recalling those of cedar and vetiver.

EXAMPLE VI

Example II was repeated, using 230 g. of benzaldehyde with 20 g. of ethanol in place of the acetaldehyde.

The neutral products of reaction were extracted with benzene and rectified by simple distillation. There was obtained 50.6 g. of a product which crystallized spontaneously. The product was recrystallized from aqueous methanol (50%), taken in petroleum ether, B.P.=60–80° C., to give the pure acetal, B.P. 103–105° C.; $[\alpha]/_D=23°$ ($CCl_4$; $C=10$). Elementary analysis confirms the composition, $C_{17}H_{24}O_2$, for the acetal of benzaldehyde, and p-menthane-diol-3,8.

The liquid part chromatographed in cyclohexane on alumina gives the isomeric acetal, as confirmed by elementary analysis.

The two acetals were characterized by their nuclear magnetic resonance spectra. The roton on $C_3$ gives a peak with Tau=6.44 for the product boiling at 103–105° C., a peak with Tau=5.73 for the other product (value on Tiers scale, for 60 Mc). Both acetals possess a tenacious, rosy odor.

The following examples illustrate the use of the acetals of this invention in perfume formulations.

EXAMPLE VII

A perfume composition having a rose note was prepared from the following formulation:

| Ingredients | Parts by weight |
| --- | --- |
| Phenylacetic aldehyde (10%) | 1 |
| Rosacetal | 2 |
| Hydroxycitronellal | 2 |
| Diphenyl oxide | 3 |
| Dimethyl benzyl carbinol | 3 |
| Phenylethyl alcohol | 19 |
| Geraniol | 20 |
| Citronellal | 40 |
| Acetal of acetaldehyde and p-menthane-diol-3,8 (Exs. I and II) | 10 |

Substitution of the acetal of acetaldehyde and p-menthene-1-diol-3,8 (Ex. IV), or the other acetals of this invention, for that of acetaldehyde and p-menthane-diol-3,8, in the above formulation, also yields compositions having a rose character.

EXAMPLE VIII

A perfume composition having a flowery-lilac note was prepared from the following formulation:

| Ingredients | Parts by weight |
| --- | --- |
| Anisic aldehyde | 2 |
| Phenylacetic aldehyde | 5 |
| Rhodinol | 8 |
| Cinnamic alcohol | 10 |
| Isoeugenol | 10 |
| Heliotropine | 10 |
| Linalool | 10 |
| Terpineol prime | 20 |
| Hydroxy citronellal | 20 |
| Acetal of acetaldehyde and p-menthane-diol-3,8 (Exs. I and II) | 5 |

Substitution of the acetal of acetaldehyde and p-menthene-1-diol-3,8 (Ex. IV), or the other acetals of this invention, for that of acetaldehyde and p-menthane-diol-3,8 in the above formulation, also yields compositions having a flowery-lilac character.

The foregoing illustrates the practice of this invention, which, however, is not to be limited thereby but is to be construed as broadly as permissible in view of the prior art and limited solely by the appended claims.

We claim:
1. A compound which is a member selected from the group consisting of an acetal of p-menthane-diol-3,8 and acetaldehyde; a formal of p-menthane-diol-3,8; an acetal of p-menthene-1-diol-3,8 and acetaldehyde; an acetal of p-menthane-diol-3,8 and isovaleric aldehyde and an acetal of p-menthane-diol-3,8 and benzaldehyde.
2. An acetal of p-menthane-diol-3,8 and acetaldehyde.
3. A formal of p-menthane-diol-3,8.
4. An acetal of p-menthene-1-diol-3,8 and acetaldehyde.
5. An acetal of p-menthane-diol-3,8 and isovaleric aldehyde.
6. An acetal of p-menthane-diol-3,8 and benzaldehyde.
7. The process for preparing an acetal of p-menthane-diol-3,8 and acetaldehyde, which comprises reacting β-citronellal and acetaldehyde in the presence of sulfuric acid at a temperature within the range from about −10° to 5° C.
8. The process for preparing a compound set forth in claim 1, which comprises reacting a member selected from the group consisting of citral and citronellal with an aldehyde selected from the group consisting of acetaldehyde, trioxymethylene, isovaleric aldehyde and benzaldehyde, at a temperature within the range from about −10° C. to about 5° C. in the presence of a catalyst selected from the group consisting of sulfuric acid and ortho-phosphoric acid.
9. The process for preparing an acetal of p-menthene-1-diol-3,8 and acetaldehyde, which comprises reacting citral and acetaldehyde in the presence of sulfuric acid within the range from about −10° to 5° C.
10. The process for preparing a compound set forth in claim 1, which comprises reacting a member selected from the group consisting of citral and citronellal with acetaldehyde at a temperature within the range from about −10° C. to 5° C., in the presence of a catalyst selected from the group consisting of sulfuric acid and ortho-phosphoric acid.
11. The process for making a mixture comprising the acetals of menthoglycol and neomenthoglycol, which comprises reacting citronellal and acetaldehyde in the presence of ortho-phosphoric acid within the range from about −10° C. to 5° C.

References Cited

UNITED STATES PATENTS

| 2,235,840 | 3/1941 | Meuly | 260—631.5 |
| 2,818,435 | 12/1957 | Bain | 260—587 |

OTHER REFERENCES

Bohnsack, H, Chemical Abstracts, vol. 38, p. 81 (1944).
Berichte, vol. 76B, pp. 564–72 (1943).
American Perfumer, vol. 69.5, p. 52 (1957).
Chemical Abstracts, vol. 22, p. 3879, 3886 (1928); vol. 31, pp. 36–37 (1937); vol. 51, p. 3934 (1957); vol. 48, p. 9020 (1954); vol. 52, p. 9732 (1958).
Durrans, T.H. The Perfumery & Essential Oil Record, May 21, 1919, vol. 10, pp. 104–136 (pp. 105, 116) 119 relied on.
Erni, M.P., Jour. Soc. Cosmetic Chemists, vol. XIV, April 1963, p. 170.
Houben-Weyl, Methoden der Organischen Chemie, vol. 613 (1965) pp. 207, 208, 214, 215.

NORMA S. MILESTONE, Primary Examiner.

U.S. Cl. X.R.
252—522; 260—631